Feb. 3, 1953 S. S. KATZ 2,627,218
AIR CONDITIONING UNIT FOR AUTOMOTIVE VEHICLES
Filed June 10, 1950 3 Sheets-Sheet 1
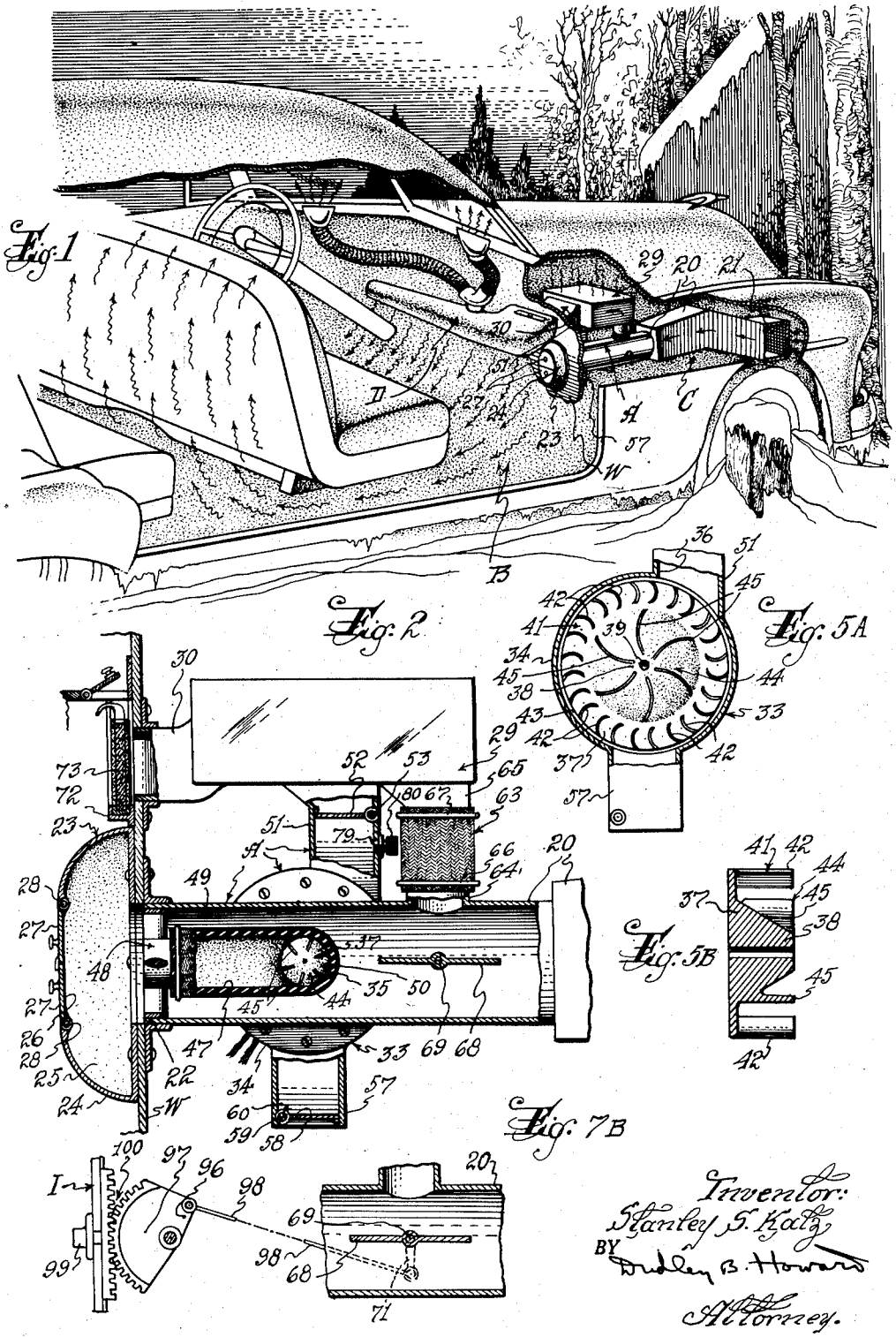
Inventor:
Stanley S. Katz
BY Dudley B. Howard
Attorney.

Feb. 3, 1953         S. S. KATZ         2,627,218
AIR CONDITIONING UNIT FOR AUTOMOTIVE VEHICLES
Filed June 10, 1950         3 Sheets-Sheet 2
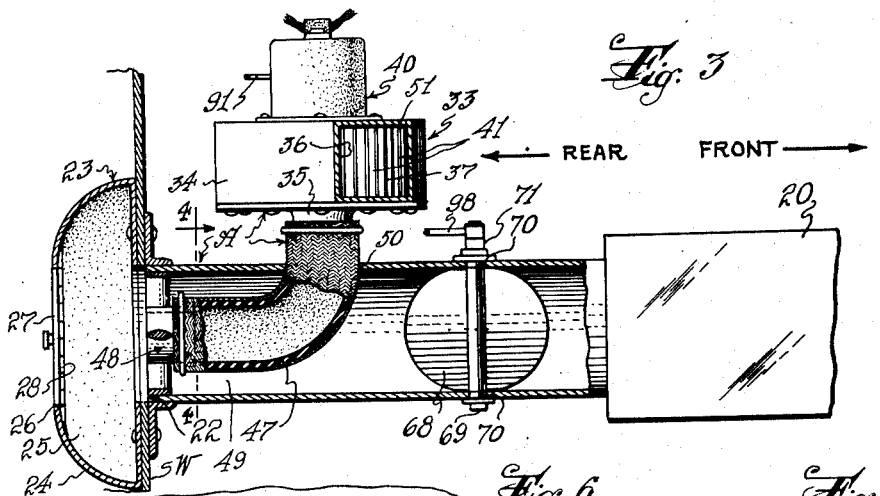
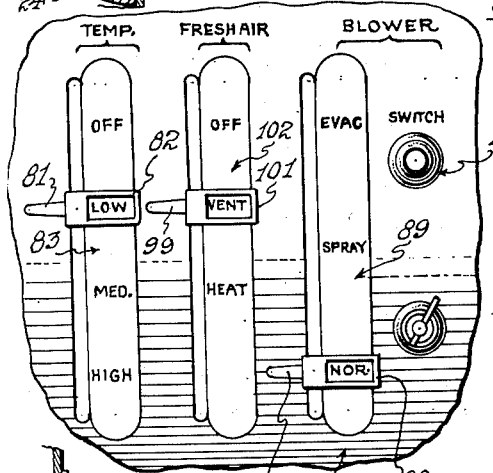
Inventor:
Stanley S. Katz
BY Dudley B. Howard
Attorney.

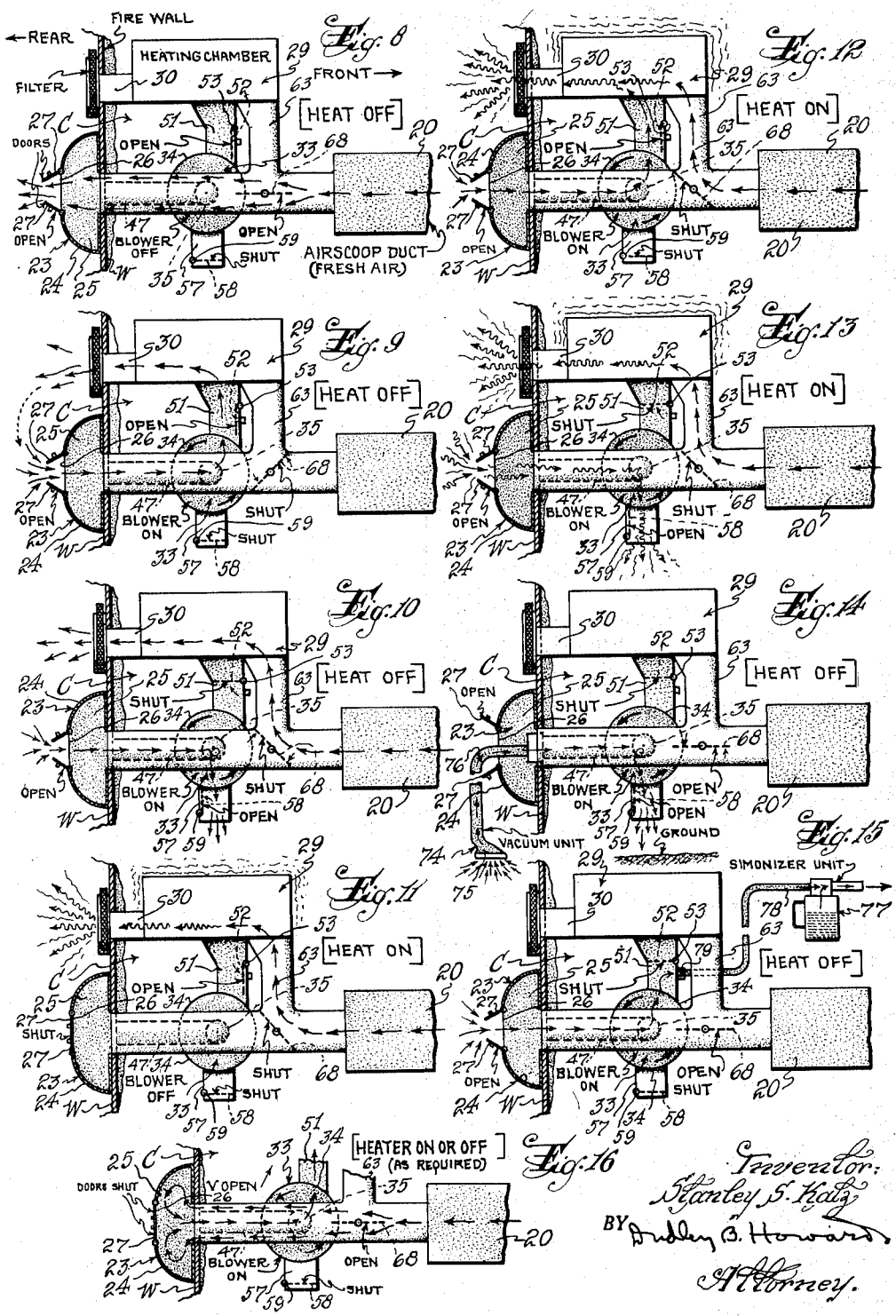

Patented Feb. 3, 1953

2,627,218

UNITED STATES PATENT OFFICE 2,627,218

AIR CONDITIONING UNIT FOR AUTOMOTIVE VEHICLES

Stanley S. Katz, Union, N. J.

Application June 10, 1950, Serial No. 167,271

8 Claims. (Cl. 98—2)

1

The invention relates in general to heating and ventilating apparatus for automotive vehicles and has particular reference to the type of such apparatus which comprises a direct duct of large capacity for conducting scooped fresh air from the radiator grille through the engine compartment to the interior of the vehicle body, a heat exchange chamber that utilizes heat from the engine cooling system, and a blower that may be operated selectively to propel either fresh air entering the forward end of the said duct or air entering the same from the body interior through the heat exchange chamber to be heated therein and thence into the body interior.

The type of prior art apparatus thus generally defined is capable of only a limited number of vehicle air conditioning functions or operations, such as: (1) scooping fresh air while the vehicle is in motion and conducting the same directly into the body interior; (2) scooping fresh air while the vehicle is in motion and diverting the airstream through the blower and heat exchange chamber into the body interior, without use of the blower, for the purpose of heating the air; (3) using the blower to force a stream of fresh air into the body interior by way of the heat exchange chamber while the vehicle is at a standstill for the purpose of heating the air, or to accelerate the rate of flow when the vehicle is in motion; and (4) re-circulating the body air by way of the heat exchange chamber either with or without application of heat.

It is the primary object of my invention to improve upon the said prior art apparatus by incorporating means by which the useful functional operations attainable are greatly increased in number to include the following additional ones, viz: (5) scooping fresh air while the vehicle is in motion and conducting it in by-passing relation to the blower through the heat exchange chamber for heating purposes without running the blower or causing its rotor to rotate; (6) evacuating spent air from the vehicle body by operation of the blower and simultaneously replacing the evacuated air by fresh air conducted from the airscoop duct directly through the heat exchange chamber in by-passing relation to the blower; (7) re-circulating vehicle body air through the heat exchange chamber by operation of the blower and simultaneously conducting fresh air from the airscoop duct directly into the heat exchange chamber for mixture therein with the re-circulated air; (8) utilizing suction created in the intake port of the blower to operate a vacuum cleaning device by means of which the body upholstery and floor may be cleaned; and (9) utilizing pressure in the outlet port of the blower to operate an airbrush spray device for use in simonizing or otherwise coating the exterior surfaces of the body.

A further object is to provide for attainment of the increased number of useful functional operations with few changes in structural details and without appreciable enlargement of the over-all bulk of the entire air conditioning unit.

Further objects and advantages of the invention will become apparent as the following specific description is read in connection with the accompanying drawing, in which:

Fig. 1 is a fragmentary perspective view of a passenger automobile, partly in section, showing the improved air conditioning unit installed therein and being operated to ventilate and heat the interior of the body thereof with fresh air while at a standstill in cold weather;

Fig. 2 is a large scale fragmentary view of the firewall of the automobile body showing in longitudinal vertical section the air conditioning unit installed in connection therewith, parts of the unit being broken away to reveal the interior mechanism;

Fig. 3 is a view similar to Fig. 2, showing the air conditioning unit in partial longitudinal horizontal section;

Fig. 4 is a transverse vertical section of the air conditioning unit taken on line 4—4 of Fig. 3, showing parts thereof broken away;

Fig. 5A is fragmentary view of the air blower, showing the same in partial vertical section;

Fig. 5B is fragmentary detail view of the high pressure impeller section of the blower rotor, showing the same in axial section;

Fig. 6 is a fragmentary front elevation of the instrument panel of the automobile body, showing the manually operable parts of the control mechanism for the various valves and switches of the air conditioning unit together with the indicating scales associated therewith;

Fig. 7A is a fragmentary view of the instrument panel and air conditioning unit, showing in side elevation and partially diagrammatically the control mechanism for the two blower valves;

Fig. 7B is a similar view of the control mechanism for the three-way valve in the airscoop duct;

Fig. 8 is an operational diagrammatic view of the air conditioning unit, representing selective control thereof for the purpose of ventilating the automobile body with cool fresh air while in motion without use of the blower;

Fig. 9 is a similar view, representing selective control for excluding objectionable outside air and re-circulating interior air;

Fig. 10 is a similar view, representing selective control for ventilating with cool fresh and simultaneously evacuating spent air from the interior;

Fig. 11 is a similar view, representing selective control for ventilating with heated fresh air while in motion;

Fig. 12 is a similar view, representing selective control for ventilating with heated fresh air while in motion and simultaneously re-circulating the interior air;

Fig. 13 is a similar view, representing selective control for ventilating with heated fresh air while in motion and simultaneously evacuating the spent interior air;

Fig. 14 is a similar view, representing selective control in connection with the use of interior vacuum cleaning apparatus;

Fig. 15 is a similar view, representing selective control in connection with the use of exterior simonizing apparatus; and Fig. 16 is a fragmentary similar view, representing selective control for ventilating with fresh air while at a standstill by use of the blower.

Referring in detail to the drawings and in particular to Fig. 1, my improved air conditioning unit is shown in its adaptation to a passenger-carrying automobile. It is to be understood, however, that the scope of my invention is considered to extend to use of the unit in any class or type of automotive vehicle or analogous conveyance or craft.

In the illustrative example, the air conditioning unit A is installed in front of the vehicle body compartment B in the hooded engine compartment C and preferably at the right side of the engine location. A vital consideration in choosing the precise location of the unit is the most advantageous arrangement of airscoop duct 20 for its primary function of conducting fresh air from the outside atmosphere to the interior of body compartment B. Fig. 1 shows the usual arrangement wherein airscoop duct 20 extends substantially horizontally from front to rear of compartment C and has its screened mouth 21 disposed at the front of said compartment where it will be immediately in rear of and facing the radiator grille (not shown). The discharge end 22 (Fig. 2) of airscoop duct 20 opens through firewall W into the interior of body compartment B.

Whereas the forward portion of airscoop duct 20 preferably is rectangular in cross-sectional contour and is relatively large, the rear portion thereof and of reduced diameter. Discharge end 22 of airscoop duct 20 is substantially flush with the rear face of firewall W and is masked by a shutter cap 23 affixed to said rear face of the firewall when said shutter cap is in closed condition. Shutter cap 23 serves to control the air flow between airscoop duct 20 and the interior of vehicle body compartment B, and vice versa, and also to permit vertical deflection of air flowing into the said body interior.

Referring now in particular to Figs. 2, 3 and 4, it will be observed that shutter cap 23 includes a body 24, which is cup-shaped and has its marginal portion attached to the firewall W surrounding the open discharge end 22 of airscoop duct 20 with the concave face of said cap forwardly presented to provide an air space 25 adjoining said discharge end of the airscoop duct for a purpose which will appear as the description progresses. Cap body 24 has a central opening 26 which is adapted to be closed by coacting shutter plates 27 that are hinged at top and bottom as at 28 for swinging movement. In the closed positions of shutter plates 27, their free edges join to effect an airtight closure of opening 26. In their open condition, shutter plates 27 may be set in angular positions which will deflect the airstream that may be entering the vehicle body compartment through airscoop duct 20 either upward or downward to suit the wishes of the occupants. Hinges 28 are of a friction type that will cause the shutter plates 27 to retain any set positions desired under normal airflow velocity conditions.

At a short distance above airscoop duct 20, a heat exchange structure including a chamber 29 is suitably mounted. This heat exchange chamber 29 has an air outlet duct 30 which penetrates firewall W and communicates with air distribution duct D (Fig. 1) that extends transversely within the vehicle body compartment B immediately in rear of said firewall. It is within the scope of my invention to employ any suitable heat exchange medium for chamber 29, but it is preferred to utilize the radiator water or other fluid of the engine cooling system for this purpose. In so doing, hose connections 31 and 32 are provided in convenient walls of heat exchange chamber 29 for establishing a fluid circulation connection between the radiator (not shown) and a tubular coil (not shown) located inside said chamber. No invention is claimed with respect to the specific structural details of the heat exchange apparatus, so further disclosure has been avoided.

An air blower 33 is mounted alongside airscoop duct 20 (preferably on the left side) and underneath heat exchange chamber 29. This blower 33 preferably comprises a narrow cylindrical casing 34 having a central air intake port 35 located on the side adjacent to airscoop duct 20 and a tangential air outlet port 36 located on top facing heat exchange chamber 29, and movable impeller means preferably in the form of a rotor 37 operatively mounted in casing 34. A convenient way to mount rotor 37 is to affix its central hub 38 to the armature shaft 39 of its prime mover, which preferably is a two-speed electric motor 40 operated on battery or generator current and which is supported by blower casing 34.

The hub 38 of blower rotor 37 is generally conical in form and is disposed with the apex of the cone facing away from the motor 40 and thus in the direction of air-scoop duct 20. An outer impeller blade section 41 of hollow cylindrical form projects axially from the periphery of hub 38 toward airscoop duct 20. This outer blade section 41 is rigidly connected to hub 38 for rotation therewith and has its end opposite to said hub open. Blade section 41 is suitably provided, as by stamping process, with a circumferential row of narrow, axially extending and radially curved blades 42 which are adapted to produce a low pressure flow of air from intake port 35 to outlet port 36. The outside diameter of blade section 41 of rotor 37 is sufficiently less than the internal diameter of casing 34 to provide an annular air space 43 surrounding the said blade section. The inside diameter of blade section 41 is slightly greater than the diameter of intake port 35 of casing 34.

Low pressure impeller blade section 41 is supplemented by a high pressure blade section 44 composed of radially curved blades 45 which are affixed to the conical face of hub 38 and which are curved oppositely with respect to blades 42 of the low pressure section. The radial extent and outwardly flaring profile (Fig. 5B) of each of these blades 45 gives blade section 44 its high pressure air impelling power.

The cooperative functioning of the low pressure and high pressure impeller sections is threefold, viz: (1) under normal operating conditions, wherein a steady slow flow of air under low pressure is desired, the outer impeller section 41 suffices for the purpose; (2) when production of a partial vacum in suction tube 47 or of high pressure in pressure-flow duct 51 is desired, by running motor 40 at high speed, high pressure impeller section 44 will accomplish this object; (3) under vacuum cleaning operation, the oppositely curved blades of the two impeller sections create a turbulence of air flow that will prevent dust from becoming deposited on the walls of the flow conducting tubes and ducts.

Motor 40 for blower rotor 37 is capable of operation at the two speeds required under control of pull switch 46 located on the instrument panel I (Fig. 6) through the medium of conventional electrical circuits which are too well known to justify detailed disclosure.

A suction tube 47, which preferably is of flexible hose construction, is associated with airscoop duct 20 in a manner designed to permit blower 33 to draw spent or foul air from the interior of vehicle body compartment B for evacuation to the atmosphere or re-circulation through heat exchange chamber 29, or to draw fresh air through airscoop duct 20 into said chamber, which ever may be desired. The diameter of suction tube 47 is considerably smaller than that of airscoop duct 20, which permits said tube 47 to be confined inside said duct 20 in the relative arrangement shown. The inner or rear portion (considering the direction of forward motion of the vehicle) of the over-all length of suction tube 47 preferably is supported concentrically in airscoop duct 20 by suitable perforate, air penetrable means, such as spider 48, with the open rear intake end of said tube substantially flush with the discharge end of air scoop duct 20. The precise diameter of suction tube 47 should be such that an annular by-passing channel 49 of substantially the same cross-sectional area and flow capacity as the interior of suction tube 47 is provided outside the concentric portion of said suction tube coextensive therewith. The outer or forward portion of suction tube 47 is bent laterally and projected through an accommodating hole 50 provided in the side wall of airscoop duct 20 in alignment with intake port 35 of blower 33. An airtight joint is effected in suitable manner between the protruding end of suction tube 47 and the blower intake port 35. Furthermore, the diameter of hole 50 in airscoop duct 20 should be such that said tube fits therein in an airtight manner. It should now be apparent that the reason for making suction tube 47 of flexible material is to facilitate installation in the disposition just described, but it should be practicable to design a metallic suction tube capable of convenient installation.

The concentric arrangement of the rear portion of suction tube 47 is preferred, but it would be within the scope of the invention to adopt some other disposition, such as eccentric, provided that the desired by-passing flow of air is not obstructed.

The outlet port 36 of blower casing 34 is connected with an air inlet opening (not shown) preferably located in the bottom wall of heat exchange chamber 29 by a vertical forced-flow air duct 51, which preferably is rectangular in cross-section for accommodation of gate valve 52, which is provided to shut off forced flow of air therethrough when desired. It is preferred to locate the hinge 53 of gate valve 52 near the upper end of duct 51 so that there will be considerable air capacity in said duct below valve 52 when in closed position. The reason for this provision will be explained later herein. Valve 52 has a fixedly attached crank rod 54 which forms part of hinge 53 and projects exteriorly of forced-flow duct 51 and presents a radial arm 55 for cooperation with control mechanism which will be described presently. A suitable spring means 56 serves to maintain valve 52 normally in seated position.

At the bottom of blower casing 34 an evacuation duct 57, which also preferably is rectangular in cross-section for the same reason, leads downward and provides direct communication between the interior of casing 34 and the atmosphere for the purpose of permitting evacuation of spent or dirty air, or air that is vitiated by tobacco smoke, from the interior of the vehicle body compartment under operating conditions which will be described later. Shut-off valve means similar to that provided for forced flow duct 51 has been installed in evacuation duct 57. This valve means includes gate valve 58 and exteriorly projecting crank rod 59, which forms part of hinge 60 and has exteriorly disposed radial arm 61 for cooperation with subsequently described control means. Hinge 60 also is located near the outer end of evacuation duct 57. Gate valve 58 also is maintained normally in seated position by spring means 62.

Immediately in advance of the laterally projecting portion, or elbow, of suction tube 47, a vertical fresh air duct 63 affords direct communication between airscoop duct 20 and a second air inlet opening (not shown) in the bottom wall of heat exchange chamber 29. By providing externally protruding circular flanges 64 and 65 in marginal relation to the openings in airscoop duct 20 and heat exchange chamber 29, respectively, that register with duct 63, it is quite convenient to employ a short section of flexible tubing to form duct 63 and thereby make allowance for any slight misalignment of the said openings which may occur during assembly of the various parts of the air conditioning unit. The ends of the tubing may embrace flanges 64 and 65 in the manner shown and be given airtight connection therewith by use of clamping bands 66 and 67, respectively. Due to the fact that duct 63 may be used to permit flow of fresh air from airscoop duct 20 directly to heating chamber 29 in by-passing relation to air blower 33, this duct 63 will be termed the "blower by-pass" duct. Heating chamber 29 and its outlet duct 30 in effect unite with both forced-flow duct 51 and blower by-pass duct 63 to constitute intercommunicating air passage means connecting air blower 33 and airscoop duct 20 with the interior of body compartment B.

In order to control flow of fresh air through airscoop duct 20 so that either: (1) direct flow from mouth 21 to and through discharge end 22 may be permitted; or (2) diversion of flow through blower by-pass duct 63 to heat exchange chamber 29 may be effected; or (3) all flow may be shut off in advance of said by-pass duct; a three-way valve means is provided in airscoop duct 20 directly beneath the intersection of blower by-pass duct 63 with said airscoop duct.

This valve means includes a butterfly valve member 68 which is affixed to a diametrical crank rod 69 that is journaled in bearings 70 provided in the side walls of airscoop duct 20 and has an exteriorly disposed lever arm 71 for cooperation with control means to be described presently.

In order that air supplied to the interior of vehicle body compartment B through discharge duct 30 of heat exchange chamber 29 may be purified or cleaned, particularly when the air is vitiated by tobacco smoke or laden with dust from a dirt road, a holder 72 of any suitable form for replaceable filter element 73 is provided in suitable relation to said discharge duct so that an assembled filter element will completely extend across the airstream and require passage of the latter through its interstices. It is within the purview of the invention to use filter elements that have an hygroscopic substance incorporated therein in order that the incoming air may be dried in wet weather, or, conversely, to use water-saturated filter elements to raise the relative humidity of the incoming air when driving through desert country or under similar conditions.

Auxiliary apparatus includes a vacuum cleaning device 74 (see Fig. 14) consisting of suction head 75 and flexible hose 76, to be used for cleaning the interior surfaces of vehicles body compartment B, and also a spray coating device 77 (see Fig. 15) having a pressure hose 78 which may be used for simonizing or otherwise coating the exterior surfaces of the vehicle. Under conditions of operational use for interior cleaning, the free end of hose 76 of vacuum cleaning device 74 is engaged with the intake end of suction tube 47 of the permanently installed air conditioning unit. For operational use of the spray coating device 77, a pressure take-off outlet preferably in the form of nipple 79 is provided on the front wall, preferably, of forced-flow duct 51 in communication with the interior thereof, which acts as a compression chamber during such use. The location of nipple 79 thus is convenient for access when the hood of the engine compartment is raised. A closure cap 80 is adapted to be threaded onto nipple 79 to seal the vent at all times when not required for application of the spray coating device.

The control means for the various valve means will now be described. Fig. 6 depicts the manipulating means for all of the valve means as concentrated in a convenient location on the instrument panel I in close proximity to the usual heat control finger-piece 81 and blower motor switch 46. It has already been explained that blower 34 may be started, stopped and regulated in speed by switch 46. Similarly, the heating medium for heat exchange chamber 29 may be turned on and off and adjusted through a practical range of temperature settings by use of finger-piece 81 in direct reference to the position of travelling index member 82 as it traverses the cardinal points of scale 83, which are denoted by appropriate indicia in well known manner.

The control means for shut-off valve 52 in forced-flow duct 51 and also shut-off valve 58 in evacuation duct 57 shown in Fig. 7A is designed for automatic coordination of the operation of both said valves in three co-related set positions. These three set positions, whose relation to the various functional operations of the air conditioning unit will be explained fully later herein, are in brief: (1) spray coating position with both valves closed; (2) evacuation position with valve 52 closed and valve 58 open; and (3) normal operating position with valve 52 open and valve 58 closed. A convenient manipulating device for this coordinated control is an oscillating disc 84 mounted on a transverse axis 85 in a concealed position behind instrument panel I and having a finger-piece 86 vertically movable with said disc and disposed on the exposed face of said panel I for manual engagement by a car occupant. By using rack and pinion movement 87 to interconnect disc 84 and finger-piece 86, it is practicable to refrain from altering the flat form of panel I as has been done heretofore. A travelling index member 88 provided on finger-piece 86 traverses scale 89, whose cardinal points are denoted appropriately by the indicia "Evac," "Spray" and "Nor" in that order from top to bottom. Conventional flexible control cables 90 and 91 extend from the vicinity of disc 84 to the lever arms 55 and 61, respectively, of valves 52 and 58 to which they are operatively connected. The ends of cables 90 and 91 opposite to those ends connected to lever arms 55 and 61, respectively, are engaged with cross-pins 92 and 93 or equivalent members which ride in lost-motion slots 94 and 95, respectively, in disc 84. The length and disposition of slots 94 and 95 and the angular arrangement of lever arms 55 and 61 are such that, when cross pins 92 and 93 are in the terminal positions shown in Fig. 7A and finger-piece 86 is in its intermediate "Spray" position, both valves will be closed. The lost motion for which provision has been made will cause the previously described "Evac" and "Nor" positions of the valves to be assumed when the finger-piece 86 is moved up or down, respectively, from the intermediate "Spray" position, as should be obvious.

The manually operable control mechanism for valves 52 and 58 disclosed in Fig. 7A has been adopted for purposes of illustration only. It is within the scope of the invention to employ other specific means for accomplishing the intended purpose. Likewise, any suitable control mechanism may be used for the three-way butterfly valve 68 in airscoop duct 20, but I have preferred to use the simple mechanism disclosed in Fig. 7B for purposes of illustration. In this illustrative embodiment, one arm 96 of a suitably pivoted operating segment 97 is connected by flexible cable 98 to lever arm 71 of butterfly valve 68. A finger-piece 99, which is operatively connected with segment 97 for movement therewith by means of rack and pinion movement 100, is mounted for vertical movement on the exposed face of instrument panel I and has an index member 101 adapted to traverse scale 102 having cardinal points appropriately denoted by the indicia "Off," "Vent" and "Heat" in that order from top to bottom. The relative angular arrangement of segment 97 and lever arm 71 of valve 68 is such that appropriate adjustment of index member 101 in relation to scale 102 will set valve 68 selectively in either of the three positions indicated by the scale indicia.

Referring particularly to Figs. 2, 3 and 16, it will be observed that shutter cap 23 cooperates with firewall W to form two-way connector means for air scoop duct 20, suction tube 47, and the interior of body compartment B. When shutters 27 are open, airscoop duct 20 and suction tube 47 are individually in communication with the body compartment, whereas, when the shutters are closed, the airscoop duct and suction tube are connected together for intercommunication just as effectively as if they were one continuous piece of tubing. The advantages of this controllable two-way connection will be brought out later herein.

Having described the operative structure of the air conditioning unit, selective control of the various air valve means, the blower motor, the heating means, and the auxiliary devices in bringing into play the numerous functions of which the unit is capable will now be discussed with reference to the successive diagrammatic views represented in Figs. 8 to 16, inclusive.

Fig. 8 represents use of the air conditioning unit to ventilate the vehicle body compartment with cool fresh air while the vehicle is in motion at a time of year when it is practicable to have the windows at least partially open for escape of spent air as it is being replaced by the incoming fresh air. In this instance, shutter cap 23 is open, three-way butterfly valve 68 is in its horizontal intermediate position corresponding to coincidence of index member 101 with cardinal point "Vent" on scale 102, power for blower 33 is off, and heat is off. The setting of valves 52 and 58 may be in the "Nor" condition shown but the precise setting is immaterial. As the vehicle moves forward, fresh air is scooped into airscoop duct 29 and passes rearwardly around suction tube 47 and through shutter cap 23, whose shutters 27 may be set to deflect the issuing air current upward toward the roof or downward toward the floor, as desired, or may be in the converging positions shown for directing a horizontal jet of air toward the occupant of the front passenger seat. The relative positions of the shutters is a matter of choice.

Fig. 9 represents the condition of the unit when set for exclusion of objectionable outside odors or dust while in motion or at a standstill and for simultaneously recirculating the internal air of the vehicle body compartment by use of blower 33. In this situation, all windows of the vehicle body compartment must be kept closed, so, in hot weather, re-circulation of inside air is especially desirable to promote evaporation of perspiration and obtain the resultant cooling effect. Furthermore, filter 73 will remove tobacco smoke, if present, and a special hydroscopic filter will tend to dry the air and further promote evaporation. If the dust or bad odor situation is encountered in cold weather, it may be desirable to turn the heat on; otherwise, it is off, as indicated. Shutter cap 23, of course, is open and blower valves 52 and 58 are in the "Nor" condition also used in Fig. 8.

The ventilation obtainable with the operational control settings shown in Figs. 8 and 9 may be had in use of the prior art apparatus upon which I have attempted to improve, but Fig. 10 discloses the achievement of a new and very important ventilating operation. By setting three-way valve 68 in the "Heat" position shown, by setting blower valves 52 and 58 in the respective closed and open, or "Evac," positions, and by turning the power for blower 33 on, spent and possibly smoke-laden air in the vehicle body compartment may be forcibly evacuated through duct 57 and replaced by fresh air entering through airscoop duct 20, blower by-pass duct 63 and heat exchange chamber 29. Replacement of the spent air will take place more rapidly if the vehicle is in motion but will occur nevertheless if at a standstill, particularly if the windows are closed.

Fig. 11 discloses operational control settings by which fresh air may be scooped in while the vehicle is in motion and then heated by diversion through heat exchange chamber 29. In this instance, three-way valve 68 is in "Heat" position and power for the blower 33 is off and heat for chamber 29 is turned on. The positions of blower valves 52 and 58 and the condition of shutter cap 23 are immaterial. This ventilating condition may be achieved in the prior apparatus, but is very sluggish unless the blower is operated, because the scooped air must pass through the blower and the obstructing rotor structure therein on its way to heat exchange chamber 29 and might cause unnecessary and objectionable rotation of the blower rotor.

Fig. 12 discloses another ventilating function which cannot be effected with the prior apparatus, viz; intake of fresh air while the vehicle is in motion and mixing of this air with re-circulated spent air in order to raise the oxygen content. The need for this action will occur usually in cold weather when the windows have to be kept closed, so heat most likely will be used, as shown. Shutter cap 23 is open, blower valves 52 and 58 are in "Nor" condition, and three-way valve 68 is in "Heat" position.

Fig. 13 represents the same operational condition as that depicted in Fig. 10, with the exception that the incoming fresh air is being heated during cold weather driving.

Fig. 14 represents the use of my air conditioning unit for the auxiliary but quite useful function of operating a vacuum cleaner in order that the interior of the vehicle body compartment may be self-cleaned, i. e., without the use of separate vacuum cleaning apparatus such as would include its own motor and have to be connected to an outside source of electric current. In this instance, the only auxiliary equipment needed is the simple device 74 which comprises a suction head 75 and a flexible hose 76. This device can be stored in a very small space anywhere that may be convenient in the vehicle body compartment. In order to use it, hose 76 is inserted through open shutter cap 23 and is plugged into the intake end of suction tube 47. With blower valves 52 and 58 set in "Evac" condition, blower 33 is turned on. The dirt-laden air sucked in through hose 76 of the vacuum cleaner into tube 47 will be discharged into the atmosphere underneath the vehicle through evacuation duct 57. Consequently, vacuum cleaning should be performed outdoors and may be done even while driving, as when it is desired to evacuate ashes or other substances which may have been spilled accidentally on the floor or upholstery.

Fig. 15 illustrates use of the air conditioning unit for operation of a spray device 77 in simonizing or otherwise coating the vehicle body or any other article or surface adjacent thereto. In this instance, pressure tube 78 is connected with nipple 79 on forced-flow duct 51 of blower 33 after cap 80 (Fig. 2) has been removed. Shutter cap 23 is opened, blower valves 52 and 58 are set in closed "Spray" condition, and power for the blower is turned on. The portion of forced-flow duct 51 beneath closed valve 52 serves as a pressure chamber and should have sufficient cubic capacity to maintain constant, non-fluctuating pressure in tube 78 of the spray device.

Fig. 16 shows the manner in which fresh air from the outside may be forced into the interior of the vehicle body compartment by use of blower 33 when the vehicle is at a standstill. In this instance, shutter cap 23 is closed, blower valves 52 and 58 are set in "Nor" condition, and the power for blower 33 is turned on. The blower will draw fresh air rearward through airscoop duct 20 around and beyond suction tube 47. Inside shutter cap 23, the airstream will reverse direction of flow and enter the open end of suction tube 47. Thence, it will pass through the blower and heat exchange chamber 29 into the interior of the vehicle body.

It now should be apparent that the improved air conditioning unit is capable of performing all of the distinct controllable ventilating and heating functions of the prior art apparatus which it is intended to supplant and several additional and very useful functions besides. Furthermore, this is accomplished with only very few changes in structure and with no appreciable increase in over-all bulk. The last-mentioned advantage is very important because compactness is essential when attempting to find space in the already crowded engine compartment for air conditioning apparatus.

Having thus described the invention, I claim:

1. The combination with a motor vehicle having an enclosed body compartment, of an air conditioning unit therefor including means by which spent air may alternately be evacuated from the body compartment and replaced simultaneously by heated fresh air or be re-circulated, said means comprising: a heat exchange structure including a chamber communicating with the body compartment, an air blower having an intake port communicating with the interior of the body compartment, an evacuation duct establishing communication between the interior of the air blower and the atmosphere, and a forced flow duct establishing communication between the interior of the air blower and said chamber of the heat exchange structure; an airscoop duct communicating with the body compartment through said chamber of the heat exchange structure to supply fresh air thereto when the vehicle is in motion; and manually operable means by which the forced-flow and evacuation ducts may alternately be opened and shut off.

2. The combination with a motor vehicle having an enclosed body compartment, of an air conditioning unit therefor including means by which air in the body compartment may be withdrawn therefrom, mixed with fresh air, either with or without heating, and returned to said compartment, said means comprising: an air blower having an intake port communicating with the body compartment and an outlet port; a heat exchange structure having a chamber communicating with the body compartment; a forced-flow air duct leading from the outlet port of the blower to the said chamber; an airscoop duct having an intake end communicating with the atmosphere and an outlet end communicating with the intake port of the air blower; a by-pass duct connecting the intake end portion of the airscoop duct to said chamber of the heat exchange structure to establish direct communication therebetween in by-passing relation to the air blower; and manually operable means by which passage of fresh air from the atmosphere through the by-pass duct may be controlled.

3. The combination with a motor vehicle having a firewall separating the engine compartment from the body compartment thereof, of an air conditioning unit therefor comprising: an airscoop duct having an intake mouth and a discharge end in communication with the body compartment through the firewall and adapted when open to supply fresh air from outside the vehicle to said compartment; a heat exchange structure including a chamber having an outlet in communication with the body compartment for delivery of air thereto; an air blower having intake and outlet ports; a forced-flow air duct leading from the outlet port of the air blower to the chamber of the heat exchange structure; a suction tube communicating with the intake port of the blower and having an intake end communicating with the interior of the body compartment through the firewall; the body compartment-communicating ends of the airscoop duct and suction tube being disposed in close relative proximity; two-way connector means associated with the said proximate ends of the airscoop duct and suction tube comprising a shutter cap including a cup-shaped body located in the body compartment with its concave side marginally affixed to the firewall in covering relation to the open adjacent ends of the airscoop duct and suction tube to provide an air channel interconnecting the same, said cap having a central opening, and shutter means adapted to close said opening whereby when said shutter means is closed blower operation will draw air fresh from the airscoop duct through the shutter cap air channel into the suction tube and through the blower; a blower by-pass duct connecting the airscoop duct directly to the chamber of the heat exchange structure; and three-way valve means located in the airscoop duct and adapted when set in one position to allow fresh air to flow directly through said airscoop duct into the body compartment, when set in a second position to direct fresh air from the intake portion of the airscoop duct through the blower by-pass duct, and when set in a third position to close the intake portion of the airscoop duct.

4. The motor vehicle air conditioning unit combination as defined in claim 3, wherein the air conditioning unit is provided with means for permitting blower action to avacuate spent air from the body compartment simultaneously with delivery of fresh air thereto when the vehicle is in motion, said means comprising an evacuation duct leading from the outlet side of the air blower to the atmosphere, a shut-off valve provided in said evacuation duct, and a shut-off valve provided in the forced-flow duct, whereby the outlet side of the blower may be closed to the chamber of the heat exchange structure and opened to the atmosphere.

5. The combination with a motor vehicle having a firewall separating the engine compartment from the body compartment, of an air conditioning unit therefor comprising: an airscoop duct having an intake mouth and a discharge end extending through the firewall into the body compartment and adapted to supply fresh air from outside the vehicle to said compartment; a heat exchange structure including a chamber having an outlet communicating with the body compartment and adapted to deliver heated air thereto; an air blower located in the engine compartment; a forced-flow air duct leading from the outlet side of the air blower to the chamber of the heat exchange structure; a blower by-pass duct leading from the airscoop duct to the chamber of the heat exchange structure; a suction tube of smaller size than the airscoop duct cooperatively arranged in relation thereto in such manner that a portion of its length extends inside said airscoop duct from the discharge end thereof a substantial distance in the direction of the intake mouth thereof and the remaining portion of said tube projects externally through the side wall of said duct and communicates with the intake side of the air blower, the relative diameters of the suction tube and airscoop duct being such that an air channel is afforded between the walls of the said duct and the interiorly located portion of said tube whereby fresh air may have free passage to the body compartment in by-passing relation to said tube portion; means for supporting the interiorly located portion of the suction tube in a position wherein its body compartment facing end is substantially flush with the discharge end of the airscoop duct; two-way connector means for the flush ends of the airscoop duct and suction tube comprising a shutter cap including a cup-shaped body located in the body compartment and having its concave side marginally affixed to the firewall in covering relation to the open adjacent ends of said duct and tube to provide an air channel connecting the same, said cap body having a central opening, and shutter means adapted to close said opening, whereby when said shutter means is closed blower operation will draw fresh air from the airscoop duct through the shutter channel into the suction tube; and three-way valve means located in the airscoop duct and adapted when set in one position to allow fresh air to flow directly through said airscoop duct into the body compartment, when set in a second position to direct fresh air from the intake portion of the airscoop duct into the blower by-pass duct, and when set in a third position to close the intake portion of the airscoop duct.

6. The motor vehicle air conditioning unit combination as defined in claim 5, wherein means is included for evacuating spent air from the body compartment to the atmosphere comprising: a shut-off valve provided in the forced-flow air duct; an evacuation duct leading from the outlet side of the air blower to the atmosphere; and a shut-off valve provided in said evacuation duct.

7. As a separate article of manufacture, an air conditioning unit comprising: an airscoop duct having an intake mouth and a discharge end; a heat exchange structure including a chamber having an outlet duct; an air blower having intake and outlet ports; a forced-flow air duct leading from the outlet port of the blower to the chamber of the heat exchange structure; a suction tube having one end connected to the intake port of the blower and the other end disposed in close proximity to the discharge end of the airscoop duct; two-way connector means associated with the adjacent ends of the airscoop duct and suction tube and adapted when set in one position to permit open communication of said duct and tube with the exterior, and when set in a second position to connect said duct and tube together for continuous intercommunication, whereby blower operation will draw fresh air from said airscoop duct; a blower by-pass duct connecting the airscoop duct directly to the chamber of the heat exchange structure; and three-way valve means located in the airscoop duct and adapted when set in one position to allow fresh air to flow directly through said airscoop duct to the discharge end thereof, when set in a second position to direct fresh air from the intake portion of the airscoop duct through the blower by-pass duct, and when set in a third position to close the intake portion of the airscoop duct.

8. An air conditioning unit as defined in claim 7, wherein means is included for evacuating air from the suction tube through the blower comprising: a shut-off valve provided in the forced-flow duct; an evacuation duct leading from the outlet side of the air blower to the atmosphere; and a shut-off valve provided in said evacuation duct.

STANLEY S. KATZ.

REFERENCES CITED

The following references are of record in the file of this patent:

UNITED STATES PATENTS

| Number | Name | Date |
| --- | --- | --- |
| 903,339 | Symons | Nov. 10, 1908 |
| 963,277 | Clifford | July 5, 1910 |
| 2,189,000 | Esposito | Feb. 6, 1940 |
| 2,277,568 | Tavernese | Mar. 24, 1942 |
| 2,325,427 | Reynolds | July 27, 1943 |
| 2,342,872 | Le Fevre et al. | Feb. 29, 1944 |
| 2,391,408 | Galamb et al. | Dec. 25, 1945 |
| 2,542,317 | Faulhaber et al. | Feb. 20, 1951 |
| 2,612,829 | Joyce | Oct. 7, 1952 |